United States Patent [19]
Noguchi et al.

[11] 3,982,504
[45]*Sept. 28, 1976

[54] INTERNAL COMBUSTION ENGINE

[75] Inventors: Masaaki Noguchi, Nagoya; Masaharu Sumiyoshi, Toyota; Yukiyasu Tanaka, Okazaki; Taro Tanaka, Chiryu, all of Japan

[73] Assignee: Nippon Soken, Inc., Nishio, Japan

[ * ] Notice: The portion of the term of this patent subsequent to Aug. 17, 1993, has been disclaimed.

[22] Filed: Feb. 25, 1974

[21] Appl. No.: 445,785

[30] Foreign Application Priority Data
Feb. 27, 1973 Japan............................ 48-23926
Nov. 6, 1973 Japan............................ 48-124663
Nov. 13, 1973 Japan............................ 48-127952
Nov. 23, 1973 Japan............................ 48-131836

[52] U.S. Cl............................. 123/32 SP; 123/32 D; 123/32 L
[51] Int. Cl.².................... F02B 19/10; F02B 19/16
[58] Field of Search.......... 123/32 SP, 32 ST, 75 B, 123/191 S, 191 SP

[56] References Cited
UNITED STATES PATENTS

| | | |
|---|---|---|
| 2,435,659 | 2/1948 | Summers.......................... 123/32 SP |
| 2,808,037 | 10/1957 | Von Seggern................... 123/32 ST |
| 3,195,520 | 7/1965 | Simko............................. 123/32 ST |
| 3,230,939 | 1/1966 | Goossak........................... 123/32 ST |
| 3,270,721 | 9/1966 | Hideg............................ 123/32 ST |
| 3,283,751 | 11/1966 | Goossak........................... 123/32 ST |
| R25,578 | 5/1964 | Witzky............................. 123/32 ST |

*Primary Examiner*—Charles J. Myhre
*Assistant Examiner*—Ronald G. Cox
*Attorney, Agent, or Firm*—Cushman, Darby & Cushman

[57] ABSTRACT

A stratified internal combustion engine has a trap chamber for a rich mixture having suction and discharge apertures communicating the trap chamber with the main combustion chamber. A separating wall is provided between the suction and discharge apertures and also a fuel injection nozzle is arranged, as a means to trap the rich mixture in said trap chamber, for supplying fuel to said suction aperture by discharging the fuel at a pressure higher than atmospheric pressure when an intake valve is opened, for thereby facilitating the introduction of the rich mixture into the trap chamber and scavenging the residual gases in the trap chamber and improving the trapping effect of the trap chamber with a resultant improvement in stratified combustion in the engine.

20 Claims, 12 Drawing Figures

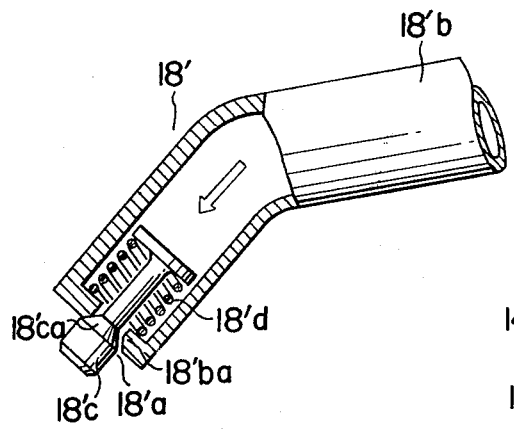
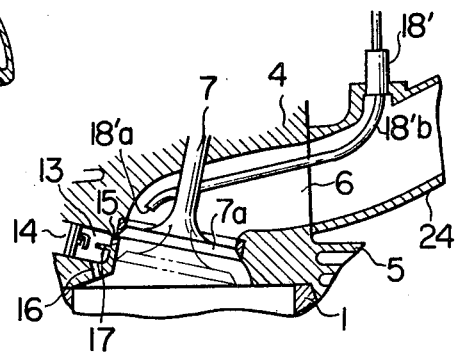
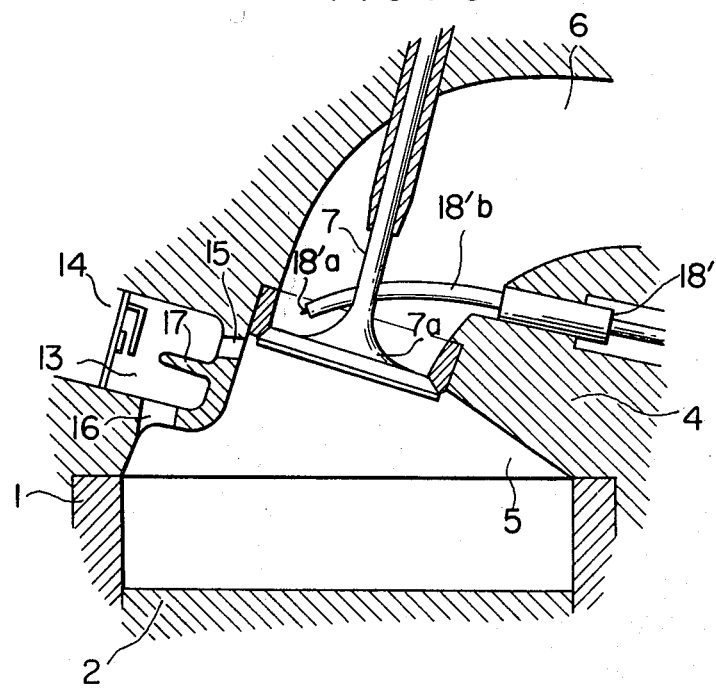

INTERNAL COMBUSTION ENGINE

DETAILED DESCRIPTION OF THE INVENTION

The present invention relates to an internal combustion engine which is intended to reduce the amount of harmful exhaust gases which give rise to public pollution.

It has been known that the amount of the harmful gaseous combustion products, such as nitrogen oxides (NOx), carbon monoxide (CO) and hydrocarbon (HC), exhausted by an internal combustion engine is closely related to the air-fuel ratio of air-fuel mixture supplied to the engine for combustion therein. It is also known that the combustion of air-fuel mixture at a large air-fuel ratio (i.e., lean mixture) reduces the amount of harmful exhaust gases over the amount generated by an air-fuel mixture at a small air-fuel ratio (i.e., rich mixture). However, since the ignitability of the air-fuel mixture by a spark plug is very limited by an air-fuel ratio, it is impossible to ignite by the spark plug the lean mixture at an air-fuel ratio outside the limited range. Thus, in order to reduce harmful exhaust gases by means of the lean combustion mixture, some other means for igniting the lean mixture is required. It has been known that a stratified combustion system is one of the means for enabling the ignition of the lean mixture. The stratified combustion system has such an arrangement that lean and rich mixtures are supplied to a combustion chamber of an internal combustion engine, a stratum of the rich mixture is formed and held in a place adjacent to the electrodes of a spark plug while a stratum of the lean mixture is formed and held in the other part of the combustion chamber, and stratum of the rich mixture is ignited by using the spark plug so that a resultant torch starts the combustion of said lean mixture.

In general, the stratified combustion can be effectively performed in a so-called "torch ignition engine" which comprises a main chamber for receiving the lean mixture, a divided or auxiliary combustion chamber for receiving the rich mixture and a spark plug having electrodes disposed in the auxiliary combustion chamber. The achievement of stratified combustion is due to the fact that the division of a combustion chamber into two chambers advantageously assures the stratification of the two kinds of mixtures.

However, it will be apparent that, even in a torch ignition engine of such a structure, the achievement of stratified combustion depends generally upon the extent to which the two stratified mixtures are maintained. Namely, in order that the stratified combustion may accomplish its best performance, it must be assured that, when the ignition is carried out using the spark plug, an ignitable rich mixture be trapped within the divided combustion chamber while a lean mixture at an intended air-fuel ratio is held within the main chamber.

To attain this purpose, it is an indispensable requirement that a rich mixture is trapped in the divided chamber in a correct manner during the suction stroke. In other words, a sufficient amount of the rich mixture having a correct air-fuel ratio must be introduced into the divided chamber and the introduced rich mixture must be held in the divided chamber in a very sure manner.

The rich mixture is usually introduced into the divided chamber either by means of a system comprising a carburator for producing the rich mixture and a passage for introducing said rich mixture or by means of a fuel injection nozzle for discharging fuel. Use of a fuel injection nozzle is much more advantageous than use of other means if considered from the viewpoints of a uniform distribution of a rich mixture to each cylinder of a multiple-cylinder engine and improvement of response during a transition time such as rapid acceleration and deceleration.

In the torch ignition engines heretofore publicly known which use a fuel injection nozzle, the fuel injection nozzle is mounted directly in a divided chamber or is provided in a passage leading to the divided chamber. In this conventional construction, since fuel (rich mixture) is directly introduced into the divided chamber during the suction stroke, the introduction of fuel is accomplished surely and effectively. But at the same time, such a construction has the following disadvantages, namely, in case the fuel injection nozzle is mounted directly in the divided chamber, the fuel injection nozzle is exposed to combustion gases having high temperature and high pressure. This naturally necessitates an expensive fuel injection nozzle produced with a material and a construction which can sufficiently withstand such combustion gases. On the other hand, if the fuel injection nozzle is provided in the passage leading to the divided chamber, usually an intake valve is arranged between said passage and the divided chamber. In this construction, although an inexpensive fuel injection nozzle can be employed to fulfill the functional requirement, the structure of a cylinder head is rendered very complicated since an intake valve for exclusive use (which is different from the intake valve provided between the main chamber and a suction port) must be disposed between said passage and the divided chamber as described previously.

In view of the disadvantages of the conventional constructions described above the present invention is characterized in that a fuel injection nozzle is used as a means for introducing a rich mixture into a trap chamber to uniformly distribute the rich mixture to each cylinder of a multiple-cylinder engine and to improve response during a transition time; that said fuel injection nozzle is provided in such a manner that fuel (rich mixture) is directly introduced into the trap chamber during suction stroke without a need to arrange an intake valve for exclusive use in the trap chamber and without exposing the fuel injection nozzle to combustion gases; and that for introducing the fuel (rich mixture) surely into the trap chamber and holding the fuel therein in a sure manner, there are provided in the trap chamber a suction aperture for receiving the supply of fuel from said fuel injection nozzle during suction stroke, a discharge aperture in communication with a main combustion chamber for exhausting residual gases during suction stroke, and a separating wall located between said suction aperture and said discharge aperture. The object of the present invention resides in attaining a sure and effective stratified combustion and reducing the amount of harmful components in exhaust gases without making complicated the structure of a cylinder head and using an inexpensive fuel injection nozzle.

According to the invention, there is provided an internal combustion engine including a cylinder, a piston, a cylinder head cooperating with said cylinder and said piston to define a main chamber for the combustion of lean mixture, an intake valve having a valve stem and a valve head connected thereto, a suction port for introducing principally air or lean mixture, a trap chamber for receiving the rich mixture and having at least one suction aperture through which the rich mixture is supplied into said trap chamber when said intake valve is opened, said trap chamber also having at least one discharge aperture communicating said trap chamber with said main chamber, and a spark plug disposed in said trap chamber, wherein an improvement comprises a fuel injection nozzle for discharging fuel at a pressure higher than atmospheric pressure when said intake valve is opened so that the rich mixture is supplied to said suction aperture, and a separating wall provided between said suction aperture and said discharge aperture in said trap chamber.

The object and features of the present invention will become more clear by the following description of the preferred embodiments taking reference with the attached drawings, in which:

FIG. 7 is a broken away structural view illustrating the important part of a fuel injection nozzle used in a fourth embodiment of said internal combustion engine according to the present invention;

FIGS. 8 and 9 are respectively views showing the important parts of the internal combustion engines according to the present invention in which the fuel injection nozzle of FIG. 7 is mounted;

Figure 1:
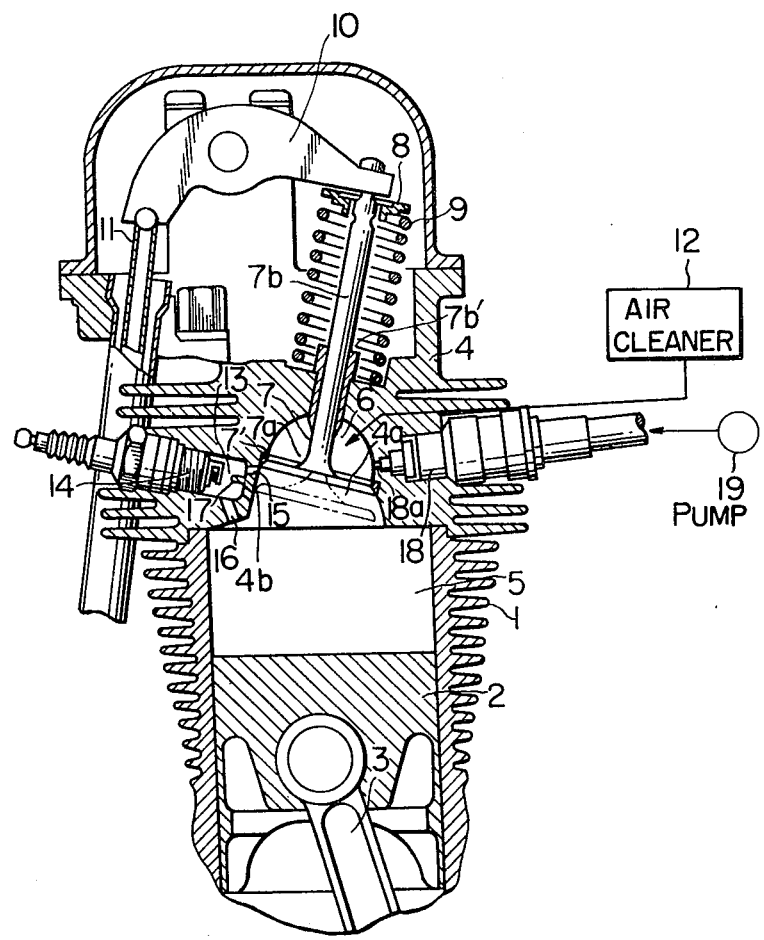
FIG. 1 is a sectional structural view showing the important part of a first embodiment of an internal combustion engine according to the present invention.

Referring first to FIG. 1, the internal combustion engine of the first embodiment of the invention has a cylinder 1 having an outer periphery provided with fins for ensuring the cooling effect of the engine. A piston 2 is mounted in the cylinder 1 and is drivingly connected to a crank mechanism (not shown) by means of a connecting rod 3 so that the reciprocal motion of the piston is converted by the crank mechanism into a rotary motion of a crank shaft (not shown) of the engine. A cylinder head 4 is mounted on the top (the upper end as viewed in FIG. 1) of the cylinder 1. The surface of the cylinder head 4 facing the interior of the cylinder 1 cooperates with the inner peripheral surface of the cylinder and the top end face of the piston 2 to define a main chamber 5. On the surface of the cylinder head 4 facing the interior of the cylinder 1, there is formed a recess 4a defining a part of the main chamber 5. The cylinder head 4 is also has its outer periphery formed with cooling fins similar to those on the cylinder 1.

A suction port 6 is formed in the cylinder head 4 and is communicated with the main chamber 5 and, particularly, with the recess 4a. An intake valve 7 and a valve seat 7' are provided between the suction port 6 and the combustion chamber 5. The intake valve 7 comprises a valve head 7a and a valve stem 7b. The valve head 7a is so positioned as to cooperate with the valve seat 7'. On the other hand, the end of the valve stem 7b projects outwardly from the top of the cylinder head 4 (the upper end as viewed in FIG. 1.) through a valve guide 7b'. A spring retainer 8 is provided on the valve stem 7b adjacent to its outer end extremity. A spring 9 is mounted around the valve stem 7b and extends between the spring retainer 8 and the cylinder head 4. The valve stem 7b is operatively connected at its end to a rocker arm 10 which in turn is operatively connected to the crank shaft by means of a push rod 11 and a cam shaft (not shown) so that the valve 7 is reciprocated in accordance with the rotation of the crank shaft, i.e., the reciprocal motion of the piston 2, with a result that the valve head 7a is moved into and out of sealing engagement with the valve seat 7' to alternately close and open the suction port 6. The suction port 6, on the other hand, communicates with an air cleaner 12 through a throttle valve (not shown) so that air is introduced into the main chamber 5.

The engine is also provided with a trap chamber 13 is the form of a cylindrical bore formed in the cylinder head 4 and extending from the outer surface thereof a distance toward the recess 4a. A spark plug 14 is fitted into the bore 13 to close the outside end of the trap chamber. The trap chamber 13 is provided with a suction aperture 15 formed in the bottom wall of the chamber 13 and extending substantially in the axial direction thereof. The trap chamber 13 also has a discharge aperture 16 formed in the bottom wall of the chamber 13 and extending toward the interior of the cylinder 1 with an inclination to the axis of the trap chamber. The suction and discharge apertures 15 and 16 communicate the trap chamber 13 with the main chamber 5. In particular, the suction aperture 15 is arranged in the vicinity of the suction port 6 and opens in the suction port 6 at a position which is on the side of the suction port 6 viewed from a position where the valve head 7a of the intake valve 7 is located when the valve is opened (broken lines in FIG. 1). The discharge aperture 16 is located adjacent to the piston 2 at the top dead center and opened approximately toward the center of the upper surface of the piston. Stated in other words, the positional relationship between the valve had 7a, the suction aperture 15 and the discharge aperture 16 is such that the valve head 7a is located between the apertures 15 and 16 when the valve 7 is in its open position.

The main combustion chamber 5 has a side wall 4b provided by the part of the bottom wall of the trap chamber 13 between the suction and discharge apertures 15 and 16. The engine is so designed that at least a part of the peripheral edge of the valve head 7a is positioned in closely spaced relationship to the side wall 4b when the valve is opened.

Although not shown in the figure, if the side wall 4b is so constructed that the surface thereof has a shape of arch conforming to the shape of the outer periphery of the valve head 7a, the areas of the parts of the side wall 4b and the outer periphery of the valve head 7a are increased, and, as will be explained later in connection with the operation, the efficiency of the introduction of fuel into the trap chamber 13 can be effectively improved. A separating wall 17 is provided between the suction aperture 15 and the discharge aperture 16 of the trap chamber 13. The separating wall 17 is located in the trap chamber 13 and separates a part close to the main chamber 5 of the trap chamber 13 into two parts, i.e., a part including the suction aperture 15 and a part including the discharge aperture 16. The numeral 18 indicates a fuel injection nozzle which discharges through its discharge orifice 18a the fuel sent under pressure from a fuel supply pump 19 at a pressure higher than atmospheric pressure. In the present invention, there is used a nozzle which discharges fuel by operating electromagnetically or a nozzle which discharges fuel by operating mechanically (the operation utilizing fuel pressure) and has the same construction as the fuel injection nozzles widely employed in Diesel engines. The fuel injection nozzle 18 is mounted in the cylinder head 4 such that its discharge orifice 18a is located in the vicinity of the rear surface of the valve head 7a of the intake valve 7 in a part opposite to the trap chamber 13 of the suction port 6. When the intake valve 7 is opened, the fuel is discharged through the suction port 6 in a direction toward the suction aperture 15 of the trap chamber 13. The fuel injection nozzle 18 discharges the fuel in synchromism with the reciprocation of the intake valve 7 when said intake valve 7 is opened. In case a nozzle operating electromagnetically is used as the fuel injection nozzle 18, the above synchronization can be attained by applying to said fuel injection nozzle 18 an electric signal in synchronism with the opening operation of the intake valve 7. And in case a nozzle operating mechanically is employed as the fuel injection nozzle 18, the synchronization can be attained by increasing the pressure applied on the fuel by the fuel supply pump 19 in a manner synchronizing with the opening operation of the intake valve 7. In practice, when the operation of the fuel injection nozzle 18 is to be synchronized with the reciprocation of the intake valve 7, the revolution of engine (the revolution of said crank shaft which transforms the reciprocation of piston into a rotary motion) is first detected. If a fuel injection nozzle operating electromagnetically is used, it is particularly convenient to take out the revolution of a distributor in ignition system (a system for supplying a high voltage to the spark plug 14) as an electric signal to be fed to the fuel injection nozzle. On the other hand, if a fuel injection nozzle operating mechanically is employed, the job can be best performed by using a fuel supply pump which is driven by said crank shaft in a manner synchronized with the revolution of said crank shaft for periodically feeding the fuel under pressure (one fuel feeding operation being done every two revolutions of the crank shaft).

It is desirable to construct the fuel injection nozzle 18 such that the fuel discharged from the discharge orifice 18a takes the form of a column.

The cylinder head 4 is provided with, in addition to the components described above, an exhaust port and an exhaust valve for which the explanation will not be done since the known types of them are employed in the present invention.

The operation of the engine with the aforestated structure and arrangement will be described hereunder. In the suction stroke of the piston 2, the valve 7 will be opened by means of the connecting rod 3, crank shaft and cam shaft (not shown), push rod 11, rocker arm 10 etc. so that the valve head 7a is moved to a position between the suction aperture 15 and the discharge aperture 16 in the trap chamber 13, as shown by broken lines in FIG. 1. The suction port 6 is in communication with the main chamber 5. Therefore, as the piston 2 moves downwardly, the air introduced from the suction port 6 is sucked in the main chamber 5. At this time, with the downward movement of the piston 2, the residual gas remaining in the trap chamber 13 is sucked principally though the discharge aperture 16 to be discharged into the main chamber 5. Simultaneously with this operation, the fuel injection nozzle 18 is operated so that the fuel is discharged from the discharge orifice 18a toward the suction aperture 15. A part of the discharged fuel flows by virtue of the energy stored therein through the suction aperture 15 and directly enters the trap chamber 13 to evaporate due to the temperature in the trap chamber 13. A large part of the remainder of said discharged fuel comes in the vicinity of the suction aperture 15 to collide with the side wall surface close to the main chamber of the cylinder head 4. The collided fuel evaporates owing to a high temperature existing around the suction aperture 15. Because the residual gas in the trap chamber 13 is sucked through the discharge aperture 16 to be discharged in the main chamber 5 as described above, a large part of the evaporated fuel is guided by an air flow passing through the suction aperture 15 to enter the trap chamber 13, and is sucked through the suction aperture 15 in the trap chamber 13. Thus, a large part of the fuel discharged from the fuel injection nozzle 18 enters the trap chamber 13 and is mixed with the air sucked in the chamber at the same time to form a rich mixture. Consequently, the rich mixture is trapped in the trap chamber 13 during suction stroke.

The fuel other than the fuel sucked in the trap chamber 13 flows into the main chamber 5 to be mixed with the air coming through the suction port 6 and forms a lean mixture.

The amount of fuel entering said trap chamber 13 can be increased either by increasing the amount of said fuel directly flowing into the trap chamber 13 through the suction aperture 15, or by increasing the amount of said fuel which collides with a structural part near the suction aperture 15 and is sucked through the suction aperture 15 in the trap chamber 13. In consequence, the air-fuel ratio of the mixture in the trap chamber 13 can be much smaller than the mean air-fuel ratio of a combined mixture consisting of the mixtures in the main chamber 5 and the trap chamber 13. Thus, the amount of fuel directly flowing into said trap chamber 13 can be increased by constructing the fuel injection nozzle 18 such that the discharged fuel takes the form of a column and the fuel column is in the direction toward the suction aperture 15. Further, the amount of fuel sucked in said trap chamber 13 can be increased by placing a part of the outer periphery of the valve head 7a in the vicinity of the surface of the side wall 4b between the suction aperture 15 and the discharge aperture 16 when the intake valve 7 is opened, and by forming said surface of the side wall 4b in a shape of arch to increase the area of the part of said wall surface brought in the vicinity of the outer periphery of the valve head 7a of the intake valve 7 so that the intake valve 7 can have a function of guiding the fuel which is being sucked.

In the meantime, it should be noted that the trapping of rich mixture in said trap chamber 13 has a close relation with the scavenging of the residual gas in the trap chamber 13. In the construction described above, the suction aperture 15 and the discharge aperture 16 are provided in the trap chamber 13, so that said suction aperture 15 has a function of introducing the fuel into the trap chamber 13 during suction stroke, and said discharge aperture 16 has a function of exhausting the residual gas in the trap chamber 13. In consequence, the residual gas in the trap chamber 13 can be scavenged quite successfully and due to the action of the separating wall 17 the scavenging efficiency can be improved to a large degree. These satisfactory results are obtained because said separating wall 17 divides the trap chamber 13 into a part including the suction aperture 15 and a part including the discharge aperture 16 so that in the trap chamber 13 there flows in a stratified manner the residual gas discharged from the discharge aperture 16 and the fuel and air coming through the suction aperture 15. Thus, the exhaustion of residual gas and the inflow of fuel take place in a cooperating manner, so that there never happens such a phenomenon that the fuel coming through the suction aperture 15 passes through the trap chamber 13 without doing anything and leaves the trap chamber 13 through the discharge aperture 16, remaining the residual gas in the trap chamber.

Moreover, said separating wall 17 guides the fuel and air to a place near the electrodes of the spark plug 14. As a result, a fresh rich mixture is at all times present in the vicinity of the spark plug 14 so that the ignitability of rich mixture can be improved when the spark plug 14 ignites the mixture.

In the compression stroke, the intake valve 7 is returned by the spring 9 to a closed position in which the valve head 7a is urged into sealing engagement with the valve seat 7', as shown by solid lines in FIG. 1, to shut off the communication between the suction port 6 and the main chamber 5. Thus, the lean mixture in the main chamber 5 is compressed as the piston is moved upwardly. As the lean mixture is compressed, a part of this mixture is introduced through the suction and discharge apertures 15 and 16 into the trap chamber 13 with a result that the rich mixture in the trap chamber is weakened or diluted and compressed. In this way, in the trap chamber 13 there is formed a mixture having an optimum value of air-fuel ratio when the spark plug 14 operates according to an ignition cycle controlled to attain a best operational result.

When the thus diluted rich mixture in the trap chamber 13 is ignited by a spark between the electrodes of the spark plug 14 to be combusted therein, torch jets will spurt through the suction and discharge apertures 15 and 16 into the main chamber 5 with a result that the lean mixture within the main chamber 5, which mixture itself is so lean that it is not ignited by a conventional spark ignition, can be ignited by the torch jet to produce a complete combustion. After the combustion of the rich and lean mixtures, the engine performs its expansion stroke to complete a cycle of operation as in conventional four-stroke cycle engines.

In the present invention, a stratified combustion of a mixture which is lean as a whole can be accomplished thanks to the operation described in the foregoing so that the amounts of CO, HC, and NO included in the exhaust gases are decreased very effectively. In the internal combustion engine according to the present invention, although the trap chamber 13 is provided in the engine, it is not necessay to arrange an intake valve (which is different from the intake valve 7 disposed between the main chamber 5 and the suction port 6) in the construction, and the intended purpose can be attained by merely mounting the fuel injection nozzle 18 in the cylinder head 4. Therefore, there is no need to make the structure of the cylinder head 4 a much complicated one. Since the discharge orifice 18a of the fuel injection nozzle 18 is located in the suction port 6, when the mixture is combusted the discharge orifice 18a is separated by the intake valve 7 from the main chamber 5 and the trap chamber 13 so that the discharge orifice 18a is never exposed to a combustion gas having a high temperature and a high pressure. For this reason, as the fuel injection nozzle 18 a nozzle can be used which is made of a cheap material and has a simple and inexpensive construction. Further according to the present invention, when a multiple-cylinder engine is the object for application of the present invention, the fuel injection nozzle is mounted in a suction port corresponding to each cylinder, and fuel is discharged in each cylinder independently of the fuel discharging operations of the other cylinders. Thus, the distribution of fuel (the rich mixture) to the cylinders is kept uniform at all times thereby totally avoiding a possibility that the combustion of the mixture will be degraded due to uneven distribution of fuel to the cylinders. At transition time such as when the engine is rapidly accelerated or decelerated, the engine can effectively follow a rapid and drastic change in the amount of rich mixture with a high degree of response. The engine can always be operated without trouble and there will never take place a temporary increase in the amounts of harmful exhaust gases.

Figure 2:
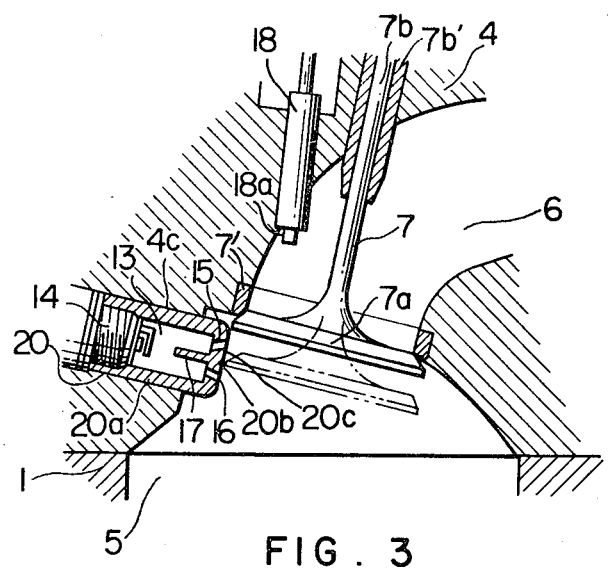
FIG. 2 is a sectional structural view illustrating the important part of a second embodiment of said internal combustion engine according to the present invention.
Figure 3:
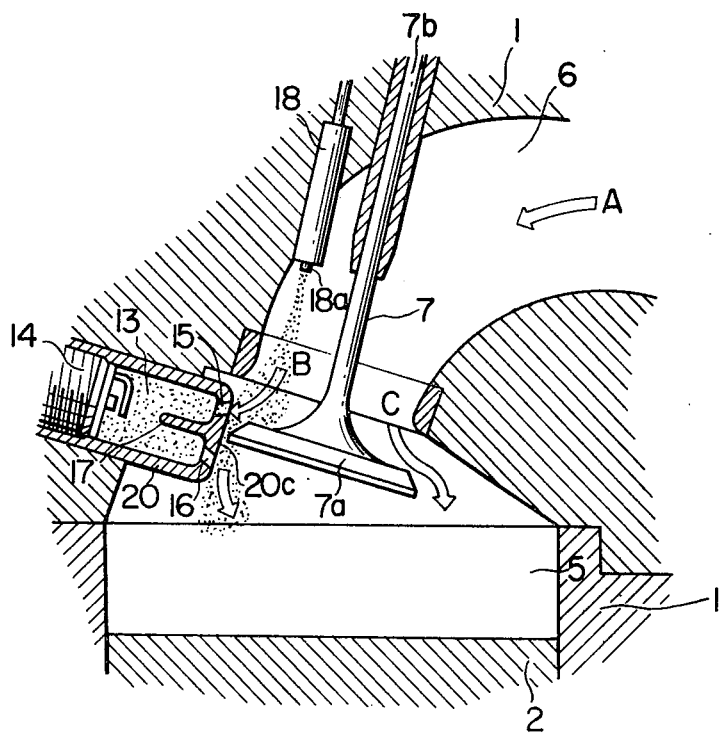
FIG. 3 is a view corresponding to FIG. 2, which shows a state during suction stroke for the purpose of explaining the operation of the internal combustion engine illustrated in FIG. 2.

FIGS. 2 and 3 show a second embodiment of the present invention in which the location of the fuel injection nozzle and the construction of the trap chamber are changed from those of the first embodiment described in the foregoing. A fuel injection nozzle 18 is mounted in a cylinder head 4 substantially in parallel with a valve stem 7b of an intake valve 7. A discharge orifice 18a of the fuel injection nozzle 18 is located in the vicinity of the rear surface of a valve head 7a of the intake valve 7 in a part close to a trap chamber 13 of a suction port 6. Fuel is discharged from the fuel injection nozzle 18 in a direction toward the outer periphery of the valve head 7a of the intake valve 7, which is located close to the trap chamber 13 when the intake valve 7 is opened. The discharging direction of fuel is substantially tangential to the flowing direction of air flow. A detailed explanation will be given later on the discharging direction of fuel.

The cylinder head 4 is provided with a through bore 4c extending from the outer peripheral surface of the cylinder head 4 to a main chamber 5. A cup-shaped housing 20 comprising a cylindrical part 20a and a bottom 20b is detachably mounted in the bore 4c in such a manner that the bottom 20b projects a certain distance into the main chamber 5, and when the intake valve 7 is opened, a part of the outer periphery of the valve head 7a of the intake valve 7 is brought in the vicinity of the central part of said bottom 20b (as shown by broken lines in FIG. 2). Thus, the interior of the housing 20 functions as the trap chamber 13. A spark plug 14 is so arranged as to substantially cover the opening of the cylindrical part 20a of the housing 20. A suction aperture 15 is disposed in the bottom 20b of the housing 20 at a position which is located on the side of the suction port 6 viewed from a position the valve head 7a takes when said intake valve 7 is opened. The suction aperture 15 opens toward the suction port 6. A discharge aperture 16 is arranged in the bottom 20b of the housing 20 at a position which is located on the side opposite to the side of said suction aperture 15 viewed from the position the valve head 7a of the intake valve 7 takes when said intake valve 7 is opened. A separating wall 17 is formed between the suction aperture 15 and the discharge aperture 16 in the bottom 20b of the housing 20 integrally with said housing. The separating wall 17 projects into the trap chamber 13 to divide the trap chamber 13 into a part including the suction aperture 15 and a part including the discharge aperture 16. A side wall 20c of the bottom 20b of the housing 20 preferably has a surface with a shape of arch in the same manner as the side wall 4b (FIG. 1) of the first embodiment.

In this construction, when the engine is in suction stroke, the fuel discharged from the fuel injection nozzle 18 is guided by the air flow in the suction port 6 to flow through the suction aperture 15 and into the trap chamber 13. Referring to FIG. 3, an air flow A coming in the suction port 6 includes a part thereof which flows in the vicinity of the trap chamber 13. Said part of the air flow A moves toward the outer periphery of the valve head 7a of the intake valve 7, which is located close to the trap chamber 13, and becomes an air flow B which is guided by the valve head 7a. The air flow B flows through the suction aperture 15 into the trap chamber 13. The fuel is discharged by means of the fuel injection nozzle 18 at a position in a part close to the trap chamber 13 of the suction port 6, which is also in the vicinity of the intake valve 7, toward the outer periphery of the valve head 7a. This discharging direction of fuel is substantially tangential to the flowing direction of said air flow B. Therefore, the discharged fuel flows with the air flow B, and a large part of the discharged fuel enters the trap chamber 13 as shown by dots in the figure to be mixed with the air flow B in said trap chamber 13. Thus, a rich mixture is formed in the trap chamber 13.

The amount of fuel entering the trap chamber 13 can be increased by surely guiding said fuel by means of the valve head 7a so that said fuel flows into the trap chamber 13. Therefore, the efficiency of fuel introduction into the trap chamber can be improved by placing a part of the outer periphery of the valve head 7a in the vicinity of the surface of the side wall 20c between the suction aperture 15 and the discharge aperture 16 when the intake valve 7 is opened, and by forming the surface of the side wall 20c in a shape of arch conforming to the shape of the outer periphery of the valve head 7a.

The remaining parts of the air flow B and the fuel which entered said trap chamber 13 flow into the main chamber 5 to be mixed with an air flow C so that a lean mixture is formed.

Thus, during suction stroke a stratum of rich mixture and a stratum of lean mixture are respectively formed and held in the trap chamber 13 and the main chamber 5 in the same manner as in the first embodiment.

In this second embodiment, the trap chamber 13 can be constructed very easily because the trap chamber 13 is formed in the housing 20 manufactured separately and the housing 20 is mounted in the cylinder head 4. In addition, a trap chamber capable of attaining a best effect can be chosen since the shape of the trap chamber 13 is changed by replacing the housing 20 with a new one. As one end of the trap chamber 13 projects into the main chamber 5 and the suction aperture 15 is disposed in this projecting end, the air and fuel flows formed in the suction port 6 can flow without losing the original speed through the suction aperture 15 to enter the trap chamber 13. Thus, the efficiency of scavenging operation in the trap chamber 13 can be improved thanks to the action of the separating wall 17 as well as the action of the construction described above.

In the second embodiment it is also noted that the fuel injection nozzle 18 is mounted in the engine such that its discharge orifice 18a comes in the vicinity of the rear surface of the valve head 7a. With this arrangement substantially all of the discharged fuel is carried by the air flow B so that an increased amount of the fuel is taken in the trap chamber 13 in a very effective manner. However, even if the fuel injection nozzle 18 is disposed at a position fairly upstream in the suction port 6, it is possible to introduce the fuel into the trap chamber 13 through the suction aperture 15 by discharging the fuel using the fuel injection nozzle 18 in a direction substantially tangential to the flowing direction of the air flow B flowing in a part close to the trap chamber 13 of the suction port 6. That is to say, assuming that the air flow A flowing in the suction port 6 comprises the air flow B flowing in the vicinity of the trap chamber 13 and the remainder air flow C, the air flows B and C normally flow in the suction port 6 maintaining this divided state and respectively reach in the vicinity of the suction aperture 15 and the interior of the main chamber 5 due to the action of the intake valve 7. Thus, the air flows B and C are never mixed together in a very complicated form. Therefore, even if the fuel is discharged at a position fairly upstream in the suction port 6 in a direction tangential to the flowing direction of said air flow B to be carried by said air flow B, the fuel flows with the air flow B through the suction aperture 15 into the trap chamber 13. And from a viewpoint of easiness of manufacture, it is generally convenient to provide the fuel injection nozzle 18 at a position upstream in the suction port 6.

Figure 4:
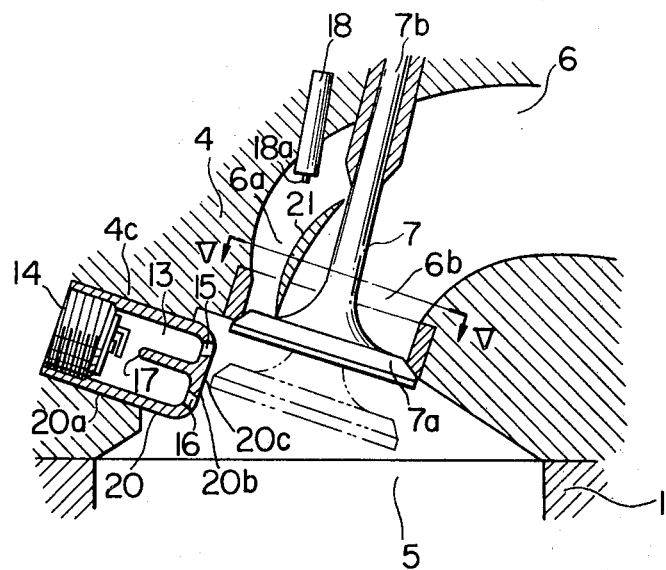
FIG. 4 is a sectional structural view showing the important part of a third embodiment of said internal combustion engine according to the present invention.
Figure 5:
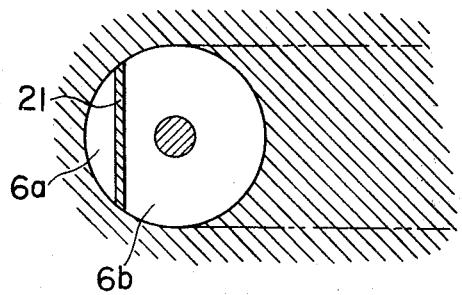
FIG. 5 is a sectional view taken along the line V—V of FIG. 4.
Figure 6:
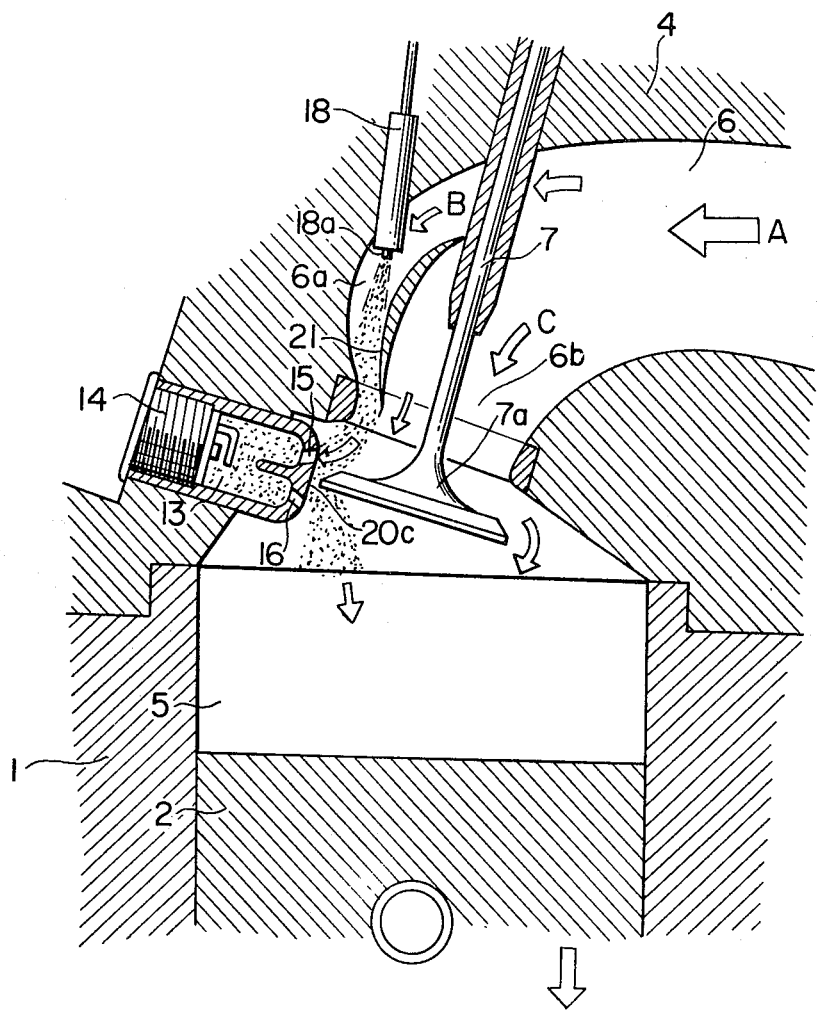
FIG. 6 is a view corresponding to FIG. 4, which illustrates a state during suction stroke for the purpose of explaining the operation of the internal combustion engine shown in FIGS. 4 and 5.

A third embodiment of the present invention shown in FIGS. 4 through 6 is a developed form of said second embodiment in which the efficiency of introduction of fuel into the trap chamber is improved. This third embodiment has a feature that a guiding wall is arranged in the suction port. In the figures, the numeral 21 indicates a guiding wall provided in the vicinity of a valve head 7a of an intake valve 7 in a suction port 6. The guiding wall 21 is so constructed that one end thereof extends to a position closely behind the position the valve head 7a of the intake valve 7 takes when the valve is closed, and comes in contact with or is placed close to said valve head 7a when the valve is closed. Said end of the guiding wall 21 is preferably turned slightly toward a suction aperture 15. A part of the suction port 6 where said guiding wall 21 is provided is divided by the guiding wall 21 into two parts. Of these two divided parts, the one close to a trap chamber is formed as a sub-suction port 6a, the other one being formed as a main suction port 6b. The sectional area of the sub-suction port 6a is smaller than that of the main suction port 6b. A fuel injection nozzle 18 is mounted in a cylinder head 4 such that a discharge orifice 18a of the fuel injection nozzle 18 is located in the sub-suction port 6a. Fuel is discharged from the fuel injection nozzle 18 in a direction substantially tangential to the flowing direction of the air flow existing in the sub-suction port 6a.

Referring to FIG. 6, the operation during suction stroke of an engine having this construction will be explained hereunder. An air flow A coming in the suction port 6 is divided by the guiding wall 21 into an air flow B in the sub-suction port 6a and an air flow C in the main suction port 6b. The air flow B passes through the sub-suction port 6a, and a part of the air flow B flows through the suction aperture 15 into a trap chamber 13 due to the action of the guiding wall 21 and the valve head 7a. Fuel is discharged in the sub-suction port 6a in a direction tangential to or at a certain angle slightly differing from the tangential angle to the flowing direction of the air flow B. The discharged fuel flows with the air flow B, and a large part of the discharged fuel enters the trap chamber 13 as shown by dots in FIG. 6 so that a rich mixture is formed in the trap chamber 13. The amount of fuel entering the trap chamber 13 can be increased by surely guiding the air flow B by means of the guiding wall 21 and the valve head 7a. The efficiency of introduction of fuel into the trap chamber 13 can be improved by turning one end of the guiding wall 21 toward the suction aperture 15, by placing a part of the outer periphery of the valve head 7a in the vicinity of the surface of a side wall 20c between the suction aperture 15 and a discharge aperture 16 when the intake valve 7 is opened, and by forming the surface of the side wall 20c in a shape of arch conforming to the shape of the outer periphery of the valve head 7a.

Although in the embodiments described in the foregoing there is employed as the fuel injection nozzle 18 a nozzle operating electromagnetically or a nozzle similar in construction to those used in Diesel engines, the present invention can employ other fuel injection nozzles with various types of construction. FIG. 7 shows an example of fuel injection nozzle which may be used in the present invention. A fuel injection nozzle 18' shown in FIG. 7 is a simplified version of a fuel injection nozzle operating mechanically, and a conduit 18'b with a circular section has at one end thereof a discharge orifice 18'a. The discharge orifice 18'a comprises a valve body 18'c a part of which forms a valve 18'ca and a spring 18'd acting on the valve body 18'c. The valve 18'ca of the valve body 18'c can be in contact with a valve seat 18'ba formed in the conduit 18'b.

To the fuel injection nozzle 18' is connected a fuel supply pump similar to that employed for the mechanically operating fuel injection nozzle in the embodiment of FIG. 1. The fuel from the fuel supply pump is introduced through the conduit 18'b, and the valve body 18'c is moved by the pressure of the fuel against the effect of the spring 18'd, so that the fuel is discharged through a space formed at this time between the valve 18'ca and the valve seat 18'ba.

When this fuel injection nozzle 18' is used, it is desirable to arrange said nozzle 18' as shown in FIG. 8 or FIG. 9. Referring to FIG. 8, the fuel injection nozzle 18' is mounted in a suction manifold 24 and the conduit 18'b of the nozzle 18' extends in the suction manifold 24 and the suction port 6. The discharge orifice 18'a provided at the end of the conduit 18'b is located in the vicinity of the valve head 7a in a part of the suction port 6 close to the trap chamber 13. Said suction manifold 24 is attached to a cylinder head 4, and one end of the suction manifold 24 is in communication with the suction port 6 while the other end communicates with an air cleaner 12 shown in FIG. 1.

Turning to FIG. 9, the fuel injection nozzle 18' is arranged in a part of the cylinder head 4 which is located opposite to the trap chamber 13 with the suction port 6 being positioned therebetween. The conduit 18'b extends across the suction port 6 so that the discharge orifice 18'a is located at a position similar to that shown in FIG. 8.

In these embodiment, the position of the discharge orifice 18'a and the discharging direction of fuel can be changed freely through a wide range by bending the end of the conduit 18'b. Therefore, the discharge orifice 18'a can be located at the optimum position no matter where the conduit 18'b is located. This naturally results in that the discharging direction of fuel can be accurately brought into alignment with a direction toward the suction aperture 15, or can be made precisely tangential to the flowing direction of the air flow entering the trap chamber 13 so that the discharged fuel can be surely carried by said air flow entering the trap chamber 13. Thus, it is possible to improve the efficiency of introduction of fuel into the trap chamber 13 with the result that the valve of air-fuel ratio of the mixture in the trap chamber 13 can be decreased in comparison with the air-fuel ratio of a combined mixture consisting of the mixture in the main chamber 5 and the mixture in the trap chamber 13. Needless to say, this contributes greatly in improving the overall efficiency of stratified combustion.

Figure 10:
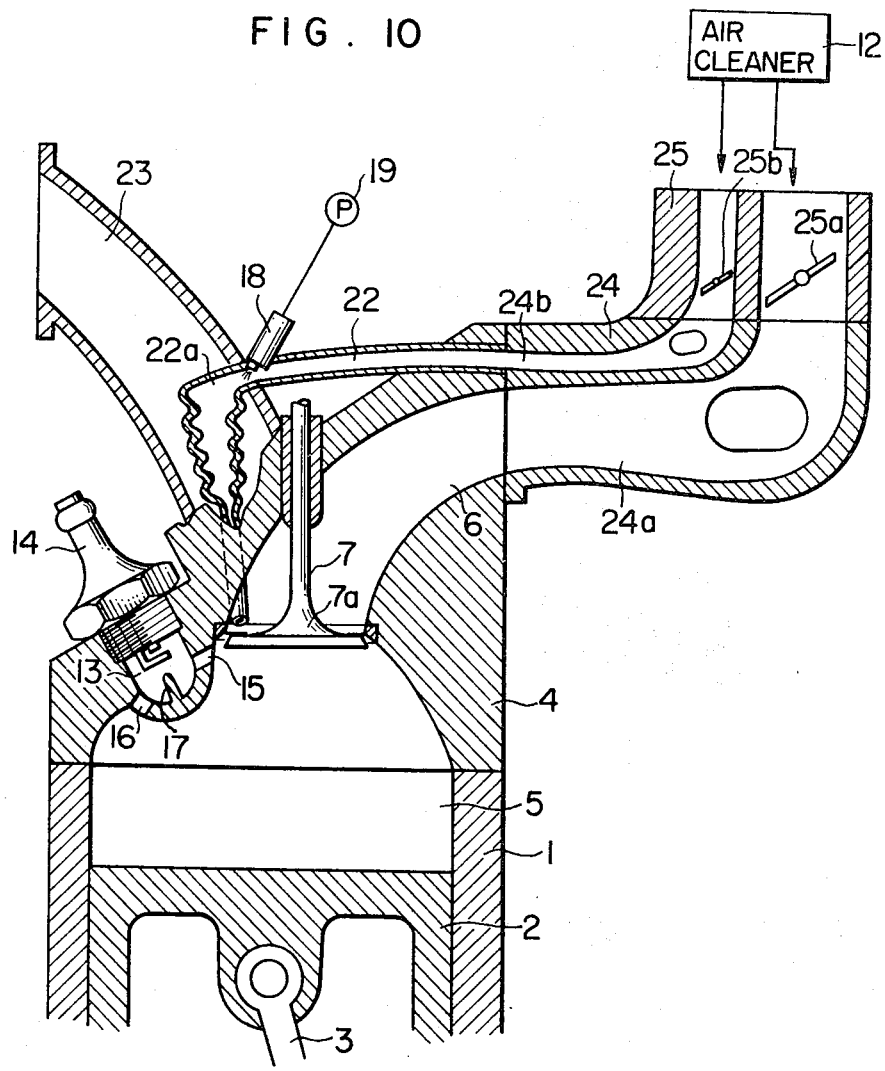
FIG. 10 is a sectional structural view illustrating the important part of a fifth embodiment of said internal combustion engine according to the present invention.
Figure 11:
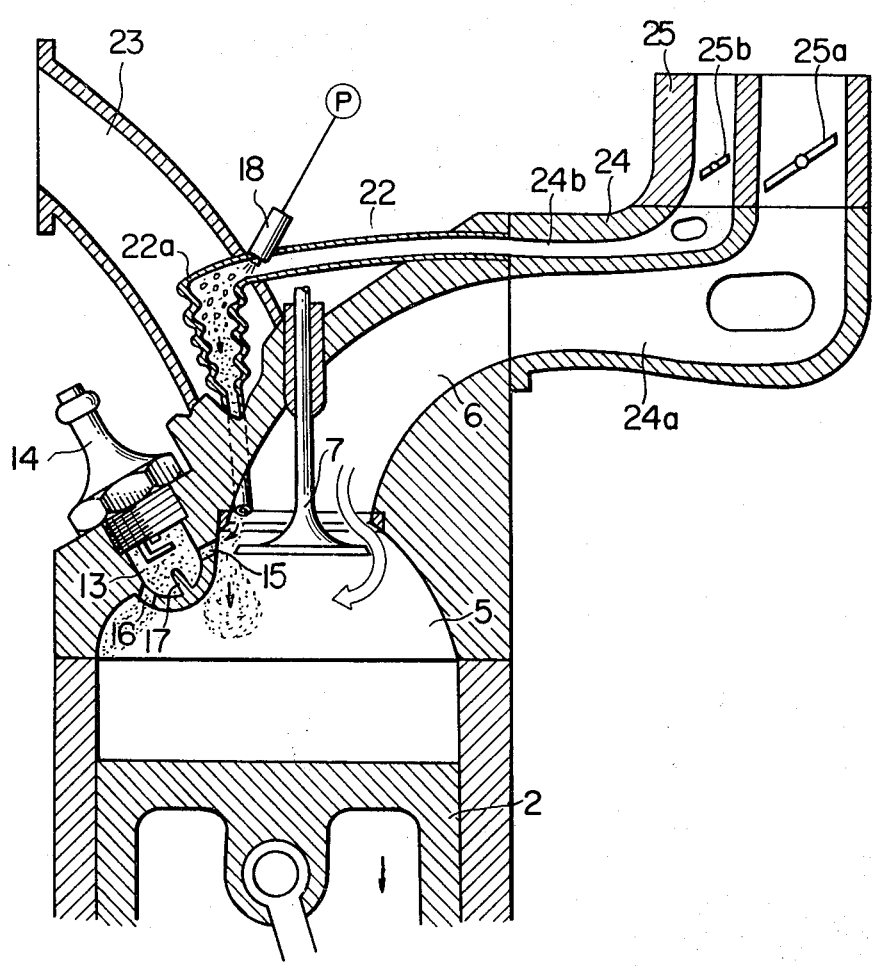
FIG. 11 is a view corresponding to FIG. 10, which shows a state during suction stroke for the purpose of explaining the operation of the internal combustion engine illustrated in FIG. 10.

The embodiment shown in FIGS. 10 and 11 has a construction that the fuel discharged by a fuel injection nozzle 18 is heated so that the vaporized fuel is introduced into a trap chamber 13. In this embodiment, there is provided a conduit 22 for supplying the rich mixture to a suction aperture 15 in the trap chamber 13. The conduit 22 extends from the outside of the engine through a cylinder head 4, and one end of the conduit 22 opens in the vicinity of the rear surface of a valve head 7a in a part close to the trap chamber 13 of a suction port 6. The fuel injection nozzle 18 is arranged such that the fuel is discharged into the conduit 22 at a position in the middle of the whole length of the conduit 22. The conduit 22 is so constructed that a part of the conduit 22 downstream of the fuel injection nozzle 18 extends through an exhaust manifold 23, and there takes place a heat exchange action between the fuel in the conduit 22 and the exhaust gas in the exhaust manifold 23. A part of the conduit 22 located in the exhaust manifold 23 has a corrugated surface for increasing surface area and volume of the conduit 22 so that said heat exchange action can be effectively performed. In the following description, this part of the conduit 22 located in the exhaust manifold 23 will be referred to as a heating section 22a. The numeral 24 indicates a suction manifold disposed in the cylinder head 4, and the numeral 25 designates a throttle body attached to said suction manifold 24. In the suction manifold 24 are formed a main passage 24a communicating with the suction port 6 and a sub-passage 24b communicating with the conduit 22. The throttle body 25 has a main throttle valve 25a for controlling the amount of air supplied to said main passage 24a and a sub-throttle valve 25b for controlling the amount of air supplied to said sub-passage 24b. In case this embodiment is applied to a multiple-cylinder engine, the main passage 24a and the sub-passage 24b of the suction manifold 24 are branched into a suitable number of passages leading to suction ports 6 and conduits 22 in the particular engine.

In the construction described above, when the engine is in suction stroke, an amount of fuel corresponding to the particular operating condition at the moment is discharged by the fuel injection nozzle 18 at a position in the middle of the conduit 22 into the air of an amount controlled by the sub-throttle valve 25b so that a rich mixture is formed. The rich mixture thus formed is a very rich one having an air-fuel ratio value of 2 – 6, and the discharged fuel normally takes the form of liquid drops. Subsequently, the rich mixture enters into the heating section 22a where it is heated by the exhaust gas in the exhaust manifold 23. The amount of rich mixture heated in such a manner can be increased by increasing the volume of the heating section 22a and by constructing the surface of the heating section 22a in the form of a corrugation so that the area in contact with the exhaust gas is increased. Thus, the fuel in the rich mixture is completely vaporized and an uniform mixture is obtained. Then, the rich mixture flows out of the open end of the heating section 22a. A large part of the rich mixture coming from the open end of the heating section 22a is guided by the intake valve 7 and is sucked in the trap chamber 13 through the suction aperture 15 to be held in the trap chamber 13. This state is shown diagrammatically in FIG. 11. The remaining part of the rich mixture, which does not enter the trap chamber 13 flows into the main chamber 5 to be mixed with the air from the suction port 6 so that a lean mixture is formed.

If the fuel in the rich mixture is vaporized so that said rich mixture is transformed into a mixture in which the vaporized fuel and the air are mixed uniformly as done in this embodiment of the present invention, there are obtained such favorable results as that the adhesion of fuel onto the wall surface of the conduit 22 can be surely prevented, that the supply of rich mixture can be controlled with a high degree of response during the transition times of engine operation such as acceleration and deceleration, and that an inappropriate combustion owing to a too rich or too lean mixture and resultant undesirable effects such as discharge of harmful exhaust gases and misfire can be prevented in a more reliable manner. In addition, a spark plug 14 in the trap chamber 13 can be prevented from becoming damp, which also excludes the possibilities of discharge of harmful exhaust gases and misfire. As the rich mixture in the conduit 22 forms only a part of all the air sucked in the engine, even if it is heated in the heating section 22a, the mixture as a whole is never overheated and the engine power will never be decreased.

Although in this embodiment the heating section 22a is heated by the exhaust gas, according to the present invention the heating section 22a may be heated by warm water for cooling the engine or by an electrical energy such as an electric heater. Further, the engine may be constructed such that the heating section 22a is heated by a combination of the above means.

Figure 12:
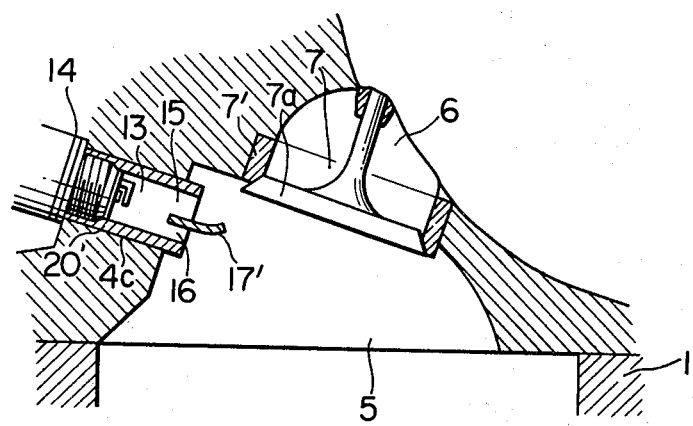
FIG. 12 is a sectional structural view showing the important part of a sixth embodiment of said internal combustion engine according to the present invention.

The embodiment shown in FIG. 12 has a construction that the separating wall employed in the embodiments described in the foregoing not only extends in a trap chamber but projects into a main chamber. A housing 20' having a cylindrical shape is mounted in a bore 4c in a cylinder head 4 and the interior of said housing 20' is formed as a trap chamber 13. In the end of the housing 20' opening toward a main chamber 5 there is provided a separating wall 17' which projects into both the main chamber 5 and the trap chamber 13. The end of the housing 20' opening toward the main chamber 5 is divided by the separating wall 17' into two parts, i.e., a part close to a suction port 6 and a part opposite to said part as viewed from the separating wall 17'. A suction aperture 15 is defined by the first mentioned part while a discharge aperture 16 is defined by the second mentioned part. The separating wall 17' has its end projecting into the main chamber 5 turned toward the suction port 6, and when an intake valve 7 is opened, a valve head 7a of the intake valve 7 comes in the vicinity of said turned end. The separating wall 17' explained here can perform the same action as that performed by the separating walls employed in the embodiments described in the foregoing.

The present invention has been explained with reference to the embodiments thereof. The present invention can also have a construction in which a lean mixture provided by the use of such a means as a carbureter is introduced into the suction port 6 in place of air.

We claim:

1. An internal combustion engine including a cylinder, a piston, a cylinder head cooperating with said cylinder and said piston to define a main combustion chamber for the combustion of a lean air-fuel mixture, an intake valve having a valve stem and a valve head connected thereto, a suction port for introducing principally air or a lean air-fuel mixture to said main combustion chamber, a trap chamber for receiving a rich air-fuel mixture to provide a torch jet ignition and having at least one suction aperture through which said rich mixture is supplied into said trap chamber when said intake valve is opened, said suction aperture being so positioned to be upstream of said valve head when said intake valve is opened, said trap chamber also having at least one discharge aperture, means including said valve head in position downstream of said suction aperture for introducing said rich air-fuel mixture to said suction aperture, said suction and discharge apertures always being in communication with said main chamber during the time when said intake valve is kept closed so that the torch jet can spurt through both of said apertures, and so that during the compression stroke, the pressure at said suction and discharge apertures is substantially equal thereby preventing a substantial portion of said rich mixture received in said trap chamber from escaping therefrom, and a spark plug having a set of electrodes exposed to said trap chamber, the improvement comprising a fuel injection nozzle provided upstream of said intake valve for discharging fuel at a pressure higher than atmospheric pressure so that the rich mixture is supplied to said suction aperture when said intake valve is opened, and a separating wall which is provided in said trap chamber between said suction aperture and said discharge aperture and which separates said trap chamber into two portions, a suction portion and a discharge portion, the discharge portion communicating with said main chamber through said discharge aperture and the suction portion communicating with said suction port through said suction aperture when said valve head is in its open position, said discharge portion and said suction portion communicating with each other at a position remote from said suction and discharge apertures, thereby facilitating the introduction of the rich mixture through said suction aperture to said set of electrodes and holding said mixture thereat.

2. An internal combustion engine according to claim 1, wherein said fuel injection nozzle has a discharge orifice which is provided in said suction port for discharging fuel toward said suction aperture when said intake valve is opened.

3. An internal combustion engine according to claim 1, wherein said fuel injection nozzle has a discharge orifice which is provided in said suction port for discharging fuel in a direction substantially tangential to the flowing direction of an air flow or lean mixture flow in said suction port which is flowing into said suction aperture when said intake valve is opened.

4. An internal combustion engine according to claim 3, wherein in said suction port there is provided a guiding wall having one end thereof extended to a position behind the valve head of said intake valve and dividing said suction port into a sub-suction port close to the trap chamber and a main suction port and guiding the mixture flow passing through said sub-suction port to said suction aperture, and wherein said discharge orifice of said fuel injection nozzle is provided in said sub-suction port.

5. An internal combustion engine according to claim 1, wherein said internal combustion engine further includes a conduit having one end thereof opened to atmospheric air and the other end thereof opened in said suction port, said conduit having in the middle of the length thereof a heating section, and wherein said fuel injection nozzle has a discharge orifice and is so disposed that said discharge orifice projects into said conduit at a position upstream of said heating section.

6. An internal combustion engine according to claim 1, wherein said combustion chamber has a wall complementary to an envelope of the outer periphery of said valve head which moves during the suction process of said engine, and wherein said suction aperture opens in said wall and upstream of said valve head when said intake valve is open, and wherein said discharge aperture opens in a portion within said combustion chamber other than an upstream portion of said valve head when said intake valve is open.

7. An internal combustion engine comprising: a cylinder, a cylinder head cooperating with said cylinder to define a main combustion chamber, an intake valve having a valve stem and a valve head connected thereto, a suction port for introducing principally air or a lean air-fuel mixture to said main combustion chamber, a trap chamber disposed in said cylinder head for receiving a rich air-fuel mixture to provide a torch jet ignition and having at least one suction aperture through which said rich mixture is supplied into said trap chamber when said intake valve is opened, said trap chamber also having at least one discharge aperture, all of said suction and discharge apertures being small enough to effect said torch jet ignition, said suction and discharge apertures always being in communication with said main combustion chamber during the time when said intake valve is kept closed so that the torch jet can spurt through both of said apertures, and so that during the compression stroke, the pressure at said suction and discharge apertures is substantially equal thereby preventing a substantial portion of said rich mixture received in said trap chamber from escaping therefrom, a spark plug having a set of electrodes exposed to said trap chamber, a fuel injection nozzle having a discharge orifice and disposed upstream of said valve head for discharging fuel at a pressure higher than atmospheric pressure to form said rich air-fuel mixture out of said fuel and said air or said lean air-fuel mixture flowing in said suction port, and means provided between said suction and discharge aperatures in said trap chamber for partially dividing said trap chamber thereby facilitating the introduction of the rich mixture through said suction aperture to said set of electrodes and holding said mixture thereat.

8. An internal combustion engine comprising:
   a cylinder;
   a piston;
   a cylinder head cooperating with said piston and cylinder to define a combustion chamber;
   a suction port in communication with said combustion chamber for introducing a lean air-fuel mixture thereto;
   an intake valve disposed in said suction port and comprising a valve head and a valve stem integrally associated therewith;
   a fuel injection nozzle having a discharge orifice disposed upstream of said valve head for discharging fuel at a pressure higher than atmospheric pressure to form a rich air-fuel mixture out of said fuel and said air or said lean air-fuel mixture flowing in said suction port;
   an ignition plug having a set of electrodes;
   an enclosure, said enclosure and said ignition plug enclosing said set of electrodes and forming a trap chamber, said trap chamber disposed in said cylinder head and having at least one suction aperture which is in communication with said suction port for receiving said rich air-fuel mixture when said intake valve is open and at least one discharge aperture which is in communication with said combustion chamber;
   a partition protruding inwardly of said trap chamber between said suction and discharge apertures;
   a continuous path being formed within said trap chamber, which is in communication with said suction aperture at one end with said discharge aperture at the other end and to which said set of electrodes are exposed;
   said trap chamber being closed except through said suction and discharge apertures;
   the mixture outside said trap chamber but within said combustion chamber flowing into said path through said suction and discharge apertures so that the inlet speeds of the flowing-in mixtures into said path through said suction aperture and said discharge aperture are approximately the same when said piston moves toward said cylinder head during the compression cycle of said engine,
   wherein during the compression cycle of said engine pressures in portions of said path near said suction and discharge apertures are in substantial equilibrium, thereby preventing a substantial portion of the rich air-fuel mixture entrapped in said trap chamber from escaping out from said trap chamber, and wherein during the suction cycle of said engine said rich air-fuel mixture scavenges said trap chamber by filling space formerly occupied by residual gases produced during the combustion cycle of said engine and sucked out through said discharge aperture during the suction cycle of said engine.

9. An internal combustion engine comprising: a cylinder, a cylinder head cooperating with said cylinder to define a main combustion chamber, an intake valve having a valve stem and a valve head connected thereto, a suction port for introducing principally air or a lean air-fuel mixture to said main combustion chamber, a trap chamber disposed in said cylinder head for receiving a rich air-fuel mixture to provide a torch jet ignition and having at least one suction aperture through which the rich mixture is supplied into said trap chamber when said intake valve is opened, said trap chamber also having at least one discharge aperture of a size small enough to effect said torch jet ignition, said suction and discharge apertures always being in communication with said main combustion chamber during the time when said intake valve is kept closed so that the torch jet can spurt through said both apertures and so that during the compression stroke, the pressure at such suction and discharge apertures is substantially equal thereby preventing a substantial portion of said rich mixture received in said trap chamber from escaping therefrom, and a spark plug having a set of electrodes exposed to said trap chamber, a fuel injection nozzle disposed upstream of said valve head to provide the rich air-fuel mixture, and means provided between said suction and discharge apertures of said trap chamber for partially dividing said trap chamber thereby facilitating the introduction of the rich mixture from said suction aperture to said set of electrodes and holding said mixture therein.

10. A torch ignition internal combustion engine comprising:
a cylinder,
a piston,
a cylinder head cooperating with said cylinder and said piston to define a main combustion chamber for the combustion of a lean air-fuel mixture,
a suction port for introducing principally air or a lean air-fuel mixture to said combustion chamber,
an intake valve having a valve stem and a valve head connected thereto, said intake valve being movably positioned with respect to said suction port,
a pot-shaped cavity having at least one suction aperture through which a rich air-fuel mixture is supplied to said cavity when said intake valve is opened, said enclosed cavity also having at least one discharge aperture,
a spark plug having a set of electrodes exposed to said enclosed cavity,
means for introducing said rich air-fuel mixture to said enclosed cavity through said suction aperture when said intake valve is opened, said introducing means including a fuel injection nozzle provided upstream of said intake valve for discharging fuel at a pressure higher than atmospheric pressure, said fuel and said air in said suction port forming said rich air-fuel mixture, said suction and discharge apertures always being in communication with said main chamber during the time when said intake valve is closed so that when said rich air-fuel mixture is ignited by said spark plug torch jets are formed by said apertures which pass therethrough into said main chamber to ignite the lean air-fuel mixture therein and during the compression stroke the pressure at said suction and discharge apertures retains a substantial portion of said rich mixture received in said enclosed cavity, and
a separating wall provided in said enclosed cavity between said suction aperture and said discharge aperture for separating said enclosed cavity into a suction portion and a discharge portion, said discharge portion communicating with said main chamber through said discharge aperture and said suction portion communicating with said suction port through said suction aperture when said valve head is in its open position, said discharge portion and said suction portion communicating with each other at a position remote from said suction and discharge apertures to thereby facilitate the introduction of said rich mixture through said suction aperture to said set of electrodes and to facilitate the scavenging of residual gases proximate said electrodes from said enclosed cavity through said discharge aperture.

11. A torch ignition internal combustion engine comprising:
a cylinder,
a piston,
a cylinder head cooperating with said cylinder and said piston to define a main combustion chamber for the combustion of a lean air-fuel mixture,
a suction port for introducing principally air or a lean air-fuel mixture to said combustion chamber,
an intake valve having a valve stem and a valve head connected thereto, said intake valve being movably positioned with respect to said suction port,
an enclosed cavity having at least one suction aperture through which a rich air-fuel mixture is supplied to said cavity when said intake valve is opened, said suction aperture being positioned upstream of said valve head when said intake is opened and downstream thereof when said intake valve is closed, said enclosed cavity also having at least one discharge aperture,
a spark plug having a set of electrodes exposed to said enclosed cavity,
means for introducing said rich air-fuel mixture to said enclosed cavity through said suction aperture when said intake valve is opened, said introducing means including a fuel injection nozzle having a discharge orifice in said suction port for discharging fuel at a pressure higher than atmospheric pressure toward said suction aperture when said intake valve is open, said fuel and said air in said suction port forming said rich air-fuel mixture, said suction and discharge apertures always being in communication with said main chamber during the time when said intake valve is closed so that when said rich air-fuel mixture is ignited by said spark plug torch jets are formed by said apertures which pass therethrough into said main chamber to ignite the lean air-fuel mixture therein and during the compression stroke the pressure at said suction and discharge apertures retains a substantial portion of said rich mixture received in said enclosed cavity, and
a separating wall provided in said enclosed cavity between said suction aperture and said discharge aperture for separating said enclosed cavity into a suction portion and a discharge portion, said discharge portion communicating with said main chamber through said discharge aperture and said suction portion communicating with said suction port through said suction aperture when said valve head is in its open position, said discharge portion and said suction portion communicating with each other at a position remote from said suction and discharge apertures to thereby facilitate the introduction of said rich mixture through said suction aperture to said set of electrodes and to facilitate the scavenging of residual gases proximate said electrodes from said enclosed cavity through said discharge aperture.

12. A torch ignition internal combustion engine comprising:
   a cylinder,
   a piston,
   a cylinder head cooperating with said cylinder and said piston to define a main combustion chamber for the combustion of a lean air-fuel mixture,
   a suction port for introducing principally air or a lean air-fuel mixture to said combustion chamber,
   an intake valve having a valve stem and a valve head connected thereto, said intake valve being movably positioned with respect to said suction port,
   an enclosed cavity having at least one suction aperture through which a rich air-fuel mixture is supplied to said cavity when said intake valve is opened, said suction aperture being positioned upstream of said valve head when said intake valve is opened and downstream thereof when said intake valve is closed, said enclosed cavity also having at least one discharge aperture,
   a spark plug having a set of electrodes exposed to said enclosed cavity,
   means for introducing said rich air-fuel mixture to said enclosed cavity through said suction aperture when said intake valve is opened, said introducing means including a fuel injection nozzle having a discharge orifice in said suction port for discharging fuel at a pressure higher than atmospheric pressure in a direction substantially tangential to the flowing direction of said air or said lean air-fuel mixture in said suction port, a portion of said fuel from said injection nozzle flowing into said enclosed cavity through said suction aperture when said intake valve is opened to form said rich air-fuel mixture, said suction and discharge apertures always being in communication with said main chamber during the time when said intake valve is closed so that when said rich air-fuel mixture is ignited by said spark plug torch jets are formed by said apertures which pass therethrough into said main chamber to ignite the lean air-fuel mixture therein and during the compression stroke the pressure at said suction and discharge apertures retains a substantial portion of said rich mixture received in said enclosed cavity, and
   a separating wall provided in said enclosed cavity between said suction aperture and said discharge aperture for separating said enclosed cavity into a suction portion and a discharge portion, said discharge portion communicating with said main chamber through said discharge aperture and said suction portion communicating with said suction port through said suction aperture when said valve head is in its open position, said discharge portion and said suction portion communicating with each other at a position remote from said suction and discharge apertures to thereby facilitate the introduction of said rich mixture through said suction aperture to said set of electrodes and to facilitate the scavenging of residual gases proximate said electrodes from said enclosed cavity through said discharge aperture.

13. A torch ignition internal combustion engine comprising:
   a cylinder,
   a piston,
   a cylinder head cooperating with said cylinder and said piston to define a main combustion chamber for the combustion of a lean air-fuel mixture,
   a suction port for introducing principally air or a lean air-fuel mixture to said combustion chamber,
   an intake valve having a valve stem and a valve head connected thereto, said intake valve being movably positioned with respect to said suction port,
   an enclosed cavity having at least one suction aperture through which a rich air-fuel mixture is supplied to said cavity when said intake valve is opened, said suction aperture being positioned upstream of said valve head when said intake valve is opened and downstream thereof when said intake valve is closed, said enclosed cavity also having at least one discharge aperture, said suction port having a guiding wall with one end thereof extended to a position behind the valve head of said intake valve and dividing said suction port into an auxiliary suction port close to said enclosed cavity for guiding fuel passing therethrough to said suction aperture, and a main suction port for guiding said air or a lean air-fuel mixture to said main combustion chamber,
   a spark plug having a set of electrodes exposed to said enclosed cavity,
   means for introducing said rich air-fuel mixture to said enclosed cavity through said suction aperture when said intake valve is opened, said introducing means including a fuel injection nozzle having a discharge orifice positioned in line with said auxiliary suction port for discharging fuel at a pressure higher than atmospheric pressure, said suction and discharge apertures always being in communication with said main chamber during the time when said intake valve is closed so that when said rich air-fuel mixture is ignited by said spark plug torch jets are formed by said apertures which pass therethrough into said main chamber to ignite the lean air-fuel mixture therein and during the compression stroke the pressure at said suction and discharge apertures retains a substantial portion of said rich mixture received in said enclosed cavity, and
   a separating wall provided in said enclosed cavity between said suction aperture and said discharge aperture for separating said enclosed cavity into a suction portion and a discharge portion, said discharge portion communicating with said main chamber through said discharge aperture and said suction portion communicating with said suction port through said suction aperture when said valve head is in its open position, said discharge portion and said suction portion communicating with each other at a position remote from said suction and discharge apertures to thereby facilitate the introduction of said rich mixture through said suction aperture to said set of electrodes and to facilitate the scavenging of residual gases proximate said electrodes from said enclosed cavity through said discharge aperture.

14. A torch ignition internal combustion engine comprising:
a cylinder,
a piston,
a cylinder head cooperating with said cylinder and said piston to define a main combustion chamber for the combustion of a lean air-fuel mixture,
a suction port for introducing principally air or a lean air-fuel mixture to said combustion chamber,
an intake valve having a valve stem and a valve head connected thereto, said intake valve being movably positioned with respect to said suction port,
an enclosed cavity having at least one suction aperture through which a rich air-fuel mixture is supplied to said cavity when said intake valve is opened, said suction aperture being positioned upstream of said valve head when said intake valve is opened and downstream thereof when said intake valve is closed, said enclosed cavity also having at least one discharge aperture,
a spark plug having a set of electrodes exposed to said enclosed cavity,
means for introducing said rich air-fuel mixture to said enclosed cavity through said suction aperture when said intake valve is opened, said introducing means including a conduit having one end thereof open to atmospheric air and the other end thereof opened in said suction port, said conduit having intermediate the length thereof a heating section, and a fuel injection nozzle having a discharge orifice disposed in said conduit at a position upstream of said heating section, said fuel injection nozzle discharging fuel at a pressure higher than atmospheric pressure, said suction and discharge apertures always being in communication with said main chamber during the time when said intake valve is closed so that when said rich air-fuel mixture is ignited by said spark plug torch jets are formed by said apertures which pass therethrough into said main chamber to ignite the lean air-fuel mixture therein and during the compression stroke the pressure at said suction and discharge apertures retains a substantial portion of said rich mixture received in said enclosed cavity, and
a separating wall provided in said enclosed cavity between said suction aperture and said discharge aperture for separating said enclosed cavity into a suction portion and a discharge portion, said discharge portion communicating with said main chamber through said discharge aperture and said suction portion communicating with said suction port through said suction aperture when said valve head is in its open position, said discharge portion and said suction portion communicating with each other at a position remote from said suction and discharge apertures to thereby facilitate the introduction of said rich mixture through said suction aperture to said set of electrodes and to facilitate the scavenging of residual gases proximate said electrodes from said enclosed cavity through said discharge aperture.

15. A torch ignition internal combustion engine comprising:
a cylinder,
a piston,
a cylinder head cooperating with said cylinder and said piston to define a main combustion chamber for the combustion of a lean air-fuel mixture,
a suction port for introducing principally air or a lean air-fuel mixture to said combustion chamber,
an intake valve having a valve stem and a valve head connected thereto, said intake valve being movably positioned with respect to said suction port,
an enclosed cavity having at least one suction aperture through which a rich air-fuel mixture is supplied to said cavity when said intake valve is opened, said suction aperture being positioned upstream of said valve head when said intake valve is opened and downstream thereof when said intake valve is closed, said enclosed cavity also having at least one discharge aperture,
a spark plug having a set of electrodes exposed to said enclosed cavity,
means for introducing said rich air-fuel mixture to said enclosed cavity through said suction aperture when said intake valve is opened, said introducing means including a fuel injection nozzle provided upstream of said intake valve in said suction port for discharging fuel at a pressure higher than atmospheric pressure, said fuel and said air in said suction portion forming said rich air-fuel mixture, said suction and discharge apertures always being in communication with said main chamber during the time when said intake valve is closed so that when sia rich air-fuel mixture is ignited by said spark plug torch jets are formed by said apertures which pass therethrough into said main chamber to ignite the lean air-fuel mixture therein and during the compression stroke the pressure at said suction and discharge apertures retains a substantial portion of said rich mixture received in said enclosed cavity, and
a separating wall provided in said enclosed cavity between said suction aperture and said discharge aperture for separating said enclosed cavity into a suction portion and a discharge portion, said discharge portion communicating with said main chamber through said discharge aperture and said suction portion communicating with said suction port through said suction aperture when said valve head is in its open position, said discharge portion and said suction portion communicating with each other at a position remote from said suction and discharge apertures to thereby facilitate the introduction of said rich mixture through said suction aperture to said set of electrodes and to facilitate the scavenging of residual gases proximate said electrodes from said enclosed cavity through said discharge aperture, said combustion chamber having a wall complementary to an envelop of the outer periphery of said valve head which moves during the suction process of said engine, and wherein said suction aperture opens in said complementary wall upstream of said valve head when said intake valve is open, said discharge aperture opening to said combustion chamber downstream of said valve head when said intake valve is open.

16. A torch ignition internal combustion engine comprising:
a cylinder,
a piston, a cylinder head cooperating with said cylinder and said piston to define a main combustion chamber for the combustion of a lean air-fuel mixture, a suction port for introducing principally air or a lean air-fuel mixture to said combustion chamber, an intake valve having a valve stem and a valve head connected thereto, said intake valve being movably positioned with respect to said suction port, a fuel injection nozzle having a discharge orifice disposed upstream of said valve head for discharging fuel at a pressure higher than atmospheric pressure, said fuel and said air in said suction port forming said rich air-fuel mixture, an ignition plug having a set of electrodes, a pot-shaped cavity receiving said set of electrodes, said cavity having at least one suction aperture through which said rich air-fuel mixture is supplied to said cavity when said intake valve is opened, said cavity including at least one discharge aperture in communication with said combustion chamber, and a partition protruding into said pot-shaped cavity between said suction and discharge apertures to partially divide said cavity to thereby define a continuous path formed within said cavity from said suction aperture at one end to said discharge aperture at the other end with said set of electrodes being exposed to said path, said partition directing said rich air-fuel mixture past said set of electrodes to thereby scavenge residual gases away from said electrodes during the suction cycle of said engine and retaining said rich air-fuel mixture proximate said electrodes during the compression cycle of said engine.

17. A torch ignition internal combustion engine comprising:

a cylinder, a piston, a cylinder head cooperating with said cylinder and said piston to define a main combustion chamber for the combustion of a lean air-fuel mixture, a suction port for introducing principally air or a lean air-fuel mixture to said combustion chamber, an intake valve having a valve steam and a valve head connected thereto, said intake valve being movably positioned with respect to said suction port, a fuel injection nozzle having a discharge orifice disposed upstream of said valve head for discharging fuel at a pressure higher than atmospheric pressure, said fuel and said air in said suction port forming said rich air-fuel mixture, an ignition plug having a set of electrodes, a pot-shaped cavity receiving said set of electrodes, said cavity having at least one suction aperture through which said rich air-fuel mixture is supplied to said cavity when said intake valve is opened, said cavity including at least one discharge aperture in communication with said combustion chamber, and a partition protruding into said pot-shaped cavity between said suction and discharge apertures to partially divide said cavity to thereby define a continuous path formed within said cavity from said suction aperture at one end to said discharge aperture at the other end with said set of electrodes being exposed to said path, said partition directing said rich air-fuel mixture past said set of electrodes to thereby scavenge residual gases away from said electrodes during the suction cycle of said engine and retaining said rich air-fuel mixture proximate said electrodes during the compression cycle of said engine, wherein said pot-shaped cavity has an end wall located contiguously with the other peripheral surface of said valve head when said intake valve is at its open position, said suction aperture opening in said end wall upstream of said valve head when said intake valve is at its open position.

18. An internal combustion engine comprising:

a cylinder, a cylinder head cooperating with said cylinder to define a main combustion chamber, an intake valve having a valve stem and a valve head connected thereto, a suction port for introducing principally air or a lean air-fuel mixture to said main combustion chamber, a pot-shaped cavity disposed in said cylinder and having at least one suction aperture through which a rich mixture is supplied into said cavity when said intake valve is opened, said cavity also having at least one discharge aperture, all of said suction and discharge apertures being small enough to form said torch jet ignition, said suction and discharge apertures always being in communication with said main combustion chamber during the time when said intake valve is closed so that said torch jet spurts through both of said apertures, and so that during the compression stroke, the pressure at said suction and discharge apertures is substantially equal thereby preventing a substantial portion of said rich mixture received in said trap member from escaping therefrom, a spark plug having a set of electrodes exposed to said cavity, a fuel injection nozzle having a discharge orifice disposed upstream of said valve head for discharging fuel at a pressure higher than atmospheric pressure to form said rich air-fuel mixture from said fuel and said air or said lean air-fuel mixture flowing in said suction port, and means provided between said suction and discharge apertures in said trap member for partially dividing said trap chamber thereby facilitating the introduction of the rich mixture through said suction aperture to said set of electrodes and holding said mixture thereat.

19. An internal combustion engine comprising:

a cylinder, a piston, a cylinder head cooperating with said piston and cylinder to define a combustion chamber, a suction port in communication with said combustion chamber for introducing a lean air-fuel mixture thereto, an intake valve disposed in said suction port and comprising a valve head and a valve stem integrally associated therewith, a fuel injection nozzle having a discharge orifice disposed upstream of said valve head for discharging fuel at a pressure higher than atmospheric pressure to form a rich air-fuel mixture out of said fuel and said air or said lean air-fuel mixture flowing in said suction port, an ignition plug having a set of electrodes, a pot-shaped enclosure, said enclosure and said ignition plug enclosing said set of electrodes and forming a chamber for trapping said rich air-fuel mixture therein, said pot-shaped enclosure disposed in said cylinder head and having at least one suction aperture which is in communication with said suction port for receiving said rich air-fuel mixture when said intake valve is open and at least one discharge aperture which is in communication with said combustion chamber, a partition protruding inwardly of said enclosure substantially midway between said suction and discharge aperture, a continuous path being formed within said enclosure which is in communication with said suction aperture at one end and with said discharge aperture at the other end and to which said set of electrodes are exposed, said trap chamber being closed except through said suction and discharge apertures, the mixture outside said enclosure but within said combustion chamber flowing into said path through said suction and discharge apertures so that the inlet speeds of the flowing-in mixtures into said path through said suction aperture and said discharge aperture are approximately the same when said piston moves toward said cylinder head during the compression cycle of said engine, thereby preventing a substantial portion of the rich air-fuel mixture entrapped in said enclosure from escaping out from said enclosure, and wherein during the suction cycle of said engine said rich air-fuel mixture scavenges said enclosure by filling space formerly occupied by residual gases produced during the combustion cycle of said engine and sucked out through said discharge aperture during the suction cycle of said engine.

20. An internal combustion engine comprising:

a cylinder, a cylinder head cooperating with said cylinder to define a main combustion chamber, an intake valve having a valve stem and a valve head connected thereto, a suction port for introducing principally air or a lean air-fuel mixture to said main combustion chamber, a pot disposed in said cylinder head for receiving a rich air-fuel mixture and having at least one suction aperture through which the rich mixture is supplied into said pot when said intake valve is opened, said pot also having at least one discharge aperture of a size small enough to effect said torch jet ignition, said suction and discharge apertures always being in communication with said main combustion chamber during the time when said intake valve is kept closed so that a torch jet spurts through both said apertures when said rich mixture in said pot is ignited, and so that during the compression stroke, the pressure at said suction and discharge apertures is substantially equal thereby preventing a substantial portion of said rich mixture received in said trap chamber from escaping therefrom, a spark plug having a set of electrodes exposed to said trap chamber, a fuel injection nozzle disposed upstream of said valve head to provide the rich air-fuel mixture, and means provided between said suction and discharge apertures of said trap chamber for partially dividing said trap chamber thereby facilitating the introduction of the rich mixture from said suction aperture to said set of electrodes and holding said mixture therein.

* * * * *